United States Patent
Ocfemia et al.

(10) Patent No.: US 9,416,006 B2
(45) Date of Patent: Aug. 16, 2016

(54) THERMAL DECOMPOSITION PROCESS FOR REDUCING AGGLOMERATE FORMATION

(71) Applicant: INEOS BIO SA, Rolle (CH)

(72) Inventors: Kim Carlo S. Ocfemia, Fayetteville, AR (US); Peter Simpson Bell, Scotland (GB)

(73) Assignee: INEOS BIO SA, Rolle (CH)

( * ) Notice: Subject to any disclaimer, the term of this patent is extended or adjusted under 35 U.S.C. 154(b) by 0 days.

(21) Appl. No.: 14/482,318

(22) Filed: Sep. 10, 2014

(65) Prior Publication Data

US 2015/0076411 A1    Mar. 19, 2015

Related U.S. Application Data

(60) Provisional application No. 61/678,940, filed on Sep. 17, 2013.

(51) Int. Cl.
| | |
|---|---|
| *C10J 3/00* | (2006.01) |
| *C01B 3/02* | (2006.01) |
| *C10J 3/72* | (2006.01) |

(52) U.S. Cl.
CPC ... *C01B 3/02* (2013.01); *C10J 3/00* (2013.01); *C10J 3/002* (2013.01); *C10J 3/723* (2013.01); *C10J 2200/154* (2013.01); *C10J 2300/0959* (2013.01); *Y02E 50/32* (2013.01)

(58) Field of Classification Search
CPC ............. F02K 9/68; C06D 5/04; Y02E 50/32; C10J 3/002; C10J 2300/0959; C10J 2200/154; C10J 3/723; C10J 3/00; C01B 3/02
See application file for complete search history.

(56) References Cited

FOREIGN PATENT DOCUMENTS

| | | | |
|---|---|---|---|
| EP | 1696177 | 8/2006 | |
| GB | 2476899 | 7/2011 | |
| WO | 2007131241 | 11/2007 | |
| WO | WO 2007131241 A2 * | 11/2007 | ............... C10J 3/002 |
| WO | 2009154788 | 12/2009 | |

OTHER PUBLICATIONS

International Searching Authority, International Search Report and Written Opinion issued in PCT/US2014/055904, mailed Dec. 8, 2014, 9 pages.

* cited by examiner

*Primary Examiner* — Stanley Silverman
*Assistant Examiner* — Syed Iqbal
(74) *Attorney, Agent, or Firm* — James P. Krueger

(57) ABSTRACT

A process provides for reducing agglomerate formation during thermal decomposition of a carbonaceous material feedstock. A non-catalytic thermal decomposition process includes providing generally solid feedstock to a thermal decomposition unit and moving the feedstock through at least one gasification zone in the thermal decomposition unit with a moving device. The process includes providing oxygen and optionally an additional gas to the gasification zone. In one aspect, the process includes moving feedstock through the gasification zone and providing oxygen to the gasification zone at rates effective for maintaining a material bed temperature not exceeding about 2300° F. at any point in the material bed, and for maintaining a material bed temperature of about 500° F. to about 2000° F.

30 Claims, 7 Drawing Sheets

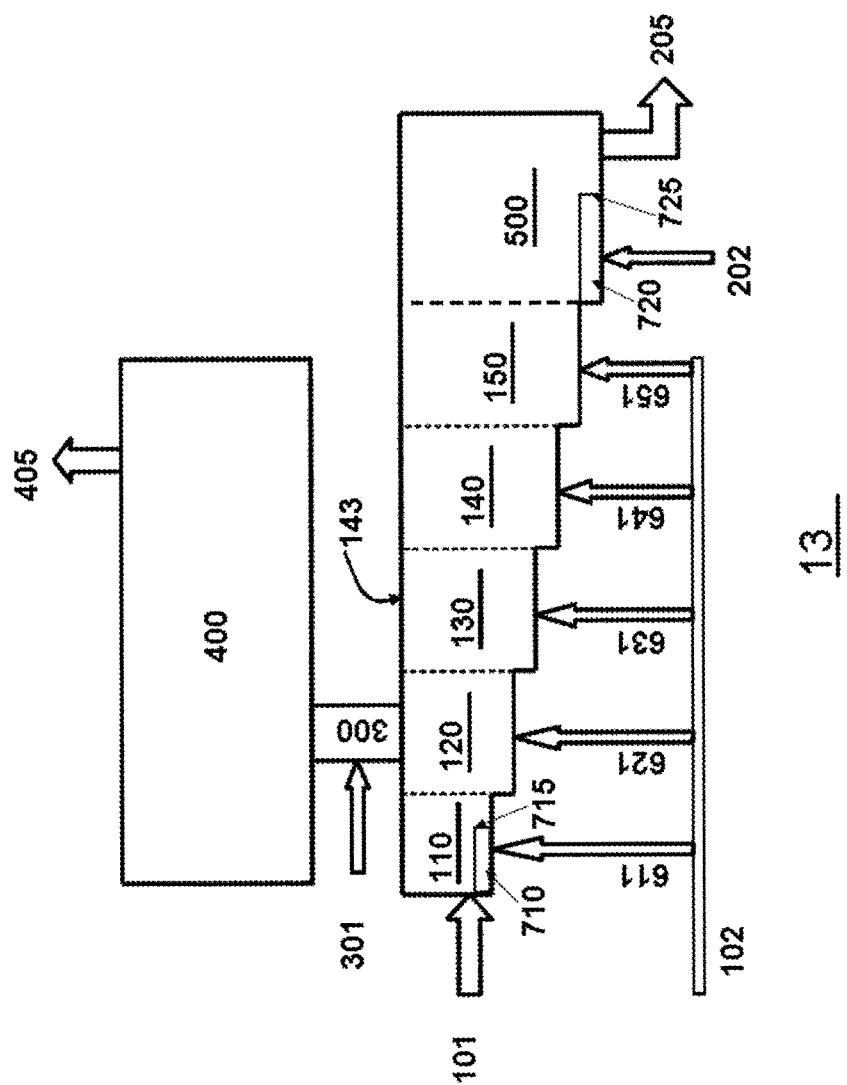

THERMAL DECOMPOSITION PROCESS FOR REDUCING AGGLOMERATE FORMATION

This application claims the benefit of U.S. Provisional Application No. 61/878,940, filed Sep. 17, 2013, which is incorporated in its entirety herein by reference.

A process provides for reducing agglomerate formation during thermal decomposition of a carbonaceous material feedstock. More specifically, the process is effective for reducing agglomerate formation by controlling amounts of oxygen and residence time of feedstock material, by improving oxygen dispersion.

BACKGROUND

Thermal decomposition processes, often referred to as gasification, include processes that are effective to convert carbonaceous feedstock, such as municipal solid waste (MSW) or coal, into a combustible gas. The gas can be used to generate electricity, steam or as a basic raw material to produce chemicals and liquid fuels.

The thermal decomposition process includes feeding carbonaceous feedstock into a heated chamber (the gasifier) along with a controlled and/or limited amount of oxygen and optionally steam. In contrast to incineration or combustion, which operate with excess oxygen to produce $CO_2$, $H_2O$, $SO_x$, and $NO_x$, thermal decomposition processes produce a raw gas composition that includes CO and $H_2$. More specifically, the thermal decomposition process involves a partial oxidation or starved-air oxidation of carbonaceous material in which a sub-stoichiometric amount of oxygen is supplied to the gasification process to promote production of carbon monoxide as described in WO 2009/154788. Success of a gasification process greatly depends on quality of syngas produced. Increased content of carbon monoxide (CO) and hydrogen ($H_2$) is desirable in syngas produced.

The means of accomplishing a thermal decomposition process vary in many ways, but tend to rely on several important engineering factors: the atmosphere (level of oxygen or air or steam content) in the gasifier; the design of the gasifier; the internal and external heating means; and the operating temperature for the process. Factors that affect the quality of the product gas include: feedstock composition, preparation and particle size; gasifier heating rate; residence time; the plant configuration including whether it employs a dry or slurry feed system, the feedstock-reactant flow geometry, the design of the dry ash or slag mineral removal system; whether it uses a direct or indirect heat generation and transfer method; and the syngas cleanup system. Gasification is usually carried out at a temperature in the range of about 650° C. to 1200° C., either under vacuum, at atmospheric pressure or at pressures up to about 100 atmospheres.

As feedstock is heated in a thermal decomposition process, carbonaceous materials in the feedstock are converted into CO, $CO_2$ and $H_2$. Mineral matter in the feedstock along with any unconverted carbonaceous material or unconverted carbon form ash. In gasifiers operating at a high temperature (>1,200° C.) or in systems with a high temperature zone, inorganic mineral matter is fused or vitrified to form a molten glass-like substance called slag.

The amount and composition of ash (e.g. carbon content) can have an impact on the smooth running of the decomposition process as well as on the disposal of ash. Melting and agglomeration of ash in the gasifier may cause slagging and clinker formation that can lead to partial or complete blocking of the gasifier.

SUMMARY

A process provides enhanced gasifier performance by reducing agglomerate formation during thermal decomposition of a carbonaceous material feedstock. Reduced agglomerate formation in the gasifier provides for longer gasifier run time and easier gasifier clean out. The process reduces agglomerate formation while maintaining a syngas quality useful for subsequent syngas fermentation.

A non-catalytic thermal decomposition process includes providing generally solid feedstock to a thermal decomposition unit and moving the feedstock through at least one gasification zone in the thermal decomposition unit with a moving device. The process includes providing oxygen and optionally an additional gas to the gasification zone. In one aspect, the process includes moving feedstock through the gasification zone and providing oxygen to the gasification zone at rates effective for maintaining a material bed temperature not exceeding about 2300° F. at any point in the material bed, and for maintaining a material bed temperature of about 500° F. to about 2000° F.

In another aspect, a non-catalytic thermal decomposition process includes providing a generally solid feedstock to a thermal decomposition unit and moving the feedstock through at least one gasification zone in the thermal decomposition unit with at least one transfer ram. The process includes moving the transfer ram at a rate effective for providing a retention time of feedstock in the gasification zone of about 0.25 hours to about 3 hours. In one aspect, the process includes providing oxygen and optionally, an additional gas to a face of the transfer ram at a rate of about 0.5 to about 1.5 lb-mol/hr-ft². When the process includes use of the additional gas, the oxygen and additional gas provided to the face of the transfer ram are at a weight ratio of about 3:1 to about 1:2.

In another aspect, the thermal decomposition process further includes moving feedstock from the at least one gasification zone to at least one burn-up zone and moving the feedstock through the at least one burn-up zone with at least one ash ram. The at least one ash ram is moved at a rate effective for providing a retention time of feedstock in the burn-up zone of about 0.5 hours to about 10 hours. The process includes conveying gas from the at least one gasification zone and at least one burn-up zone to a tar destruction zone to form a syngas. The thermal decomposition process is effective for providing a syngas having a CO content of about 20 mole % or more and for providing a syngas having a $CO/CO_2$ ratio of at least 0.75.

BRIEF DESCRIPTION OF FIGURES

The above and other aspects, features and advantages of several aspects of the process will be more apparent from the following figures.

FIG. 3 is a schematic diagram of an aspect of a thermal decomposition apparatus that includes a gasification zone, a burn-up zone and a tar reduction zone wherein the gasification zone includes five sections or hearths.

Figure 1:
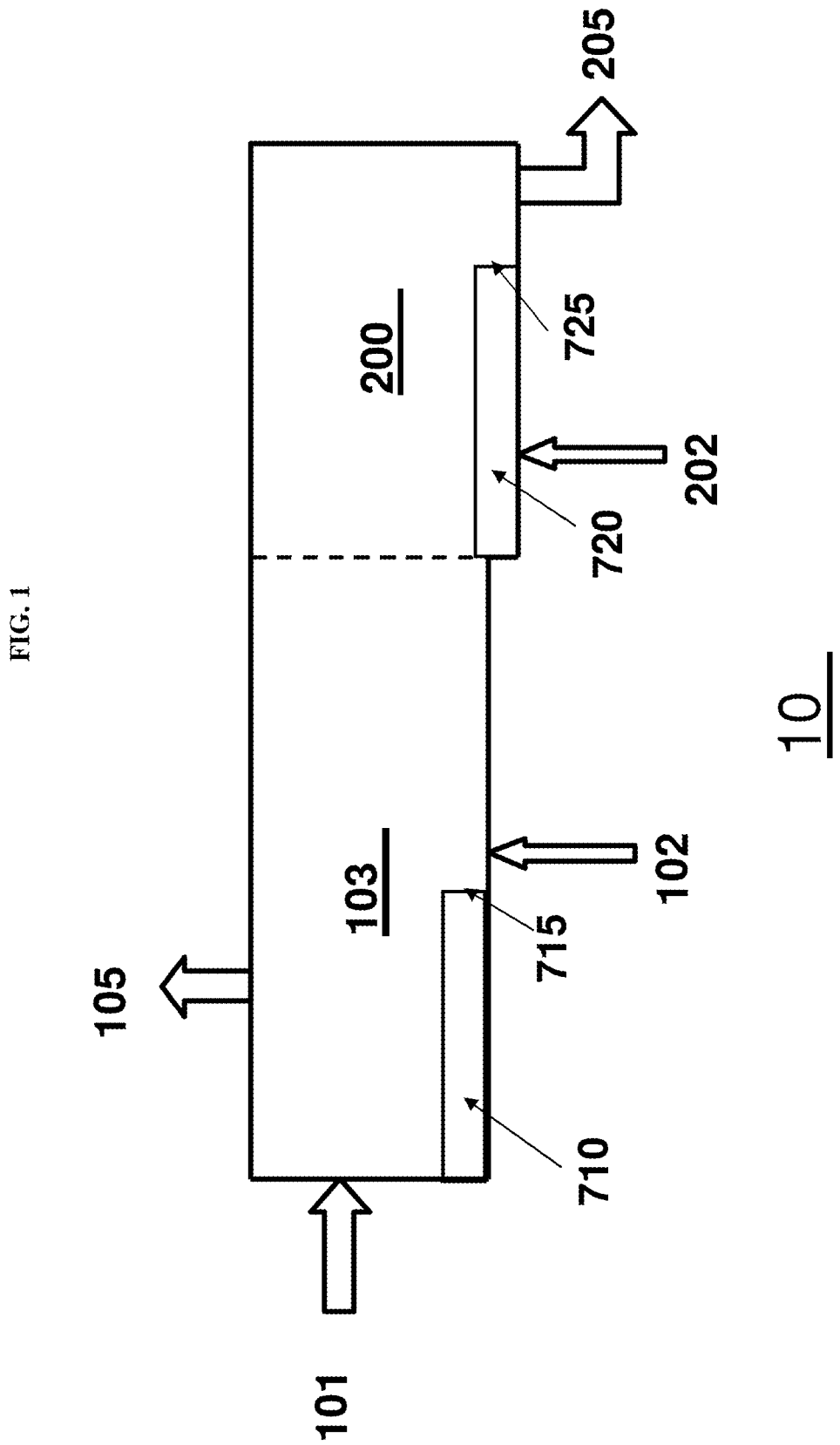
FIG. 1 is a schematic diagram of a thermal decomposition apparatus that includes a gasification zone and a burn-up zone.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various aspects of the present process and apparatus. Also, common but well-understood elements that are useful or necessary in commercially feasible aspects are often not depicted in order to facilitate a less obstructed view of these various aspects.

DETAILED DESCRIPTION

The following description is not to be taken in a limiting sense, but is made merely for the purpose of describing the general principles of exemplary embodiments. The scope of the invention should be determined with reference to the claims.

DEFINITIONS

Unless otherwise defined, the following terms as used throughout this specification for the present disclosure are defined as follows and can include either the singular or plural forms of definitions below defined:

The term "about" modifying any amount refers to the variation in that amount encountered in real world conditions, e.g., in the lab, pilot plant, or production facility. For example, an amount of an ingredient or measurement employed in a mixture or quantity when modified by "about" includes the variation and degree of care typically employed in measuring in an experimental condition in production plant or lab. For example, the amount of a component of a product when modified by "about" includes the variation between batches in a multiple experiments in the plant or lab and the variation inherent in the analytical method. Whether or not modified by "about," the amounts include equivalents to those amounts. Any quantity stated herein and modified by "about" can also be employed in the present disclosure as the amount not modified by "about".

"Carbonaceous material" as used herein refers to carbon rich material such as coal, and petrochemicals. However, in this specification, carbonaceous material includes any carbon material whether in solid, liquid, gas, or plasma state. Among the numerous items that can be considered carbonaceous material, the present disclosure contemplates: carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, or their combinations.

The term "fibersoft" or "Fibersoft" or "fibrosoft" or "fibrousoft" means a type of carbonaceous material that is produced as a result of softening and concentration of various substances; in an example carbonaceous material is produced via steam autoclaving of various substances. In another example, the fibersoft can include steam autoclaving of municipal, industrial, commercial, and medical waste resulting in a fibrous mushy material.

The term "municipal solid waste" or "MSW" or "msw" means waste that may include household, commercial, industrial and/or residual waste.

The term "syngas" or "synthesis gas" means synthesis gas which is the name given to a gas mixture that contains varying amounts of carbon monoxide and hydrogen. Examples of production methods include steam reforming of natural gas or hydrocarbons to produce hydrogen, the gasification of coal and in some types of waste-to-energy gasification facilities. The name comes from their use as intermediates in creating synthetic natural gas (SNG) and for producing ammonia or methanol. Syngas is combustible and is often used as a fuel source or as an intermediate for the production of other chemicals.

"Ton" or "ton" refers to U.S. short ton, i.e. about 907.2 kg (2000 lbs).

In addition to carbon and hydrogen, feedstocks will include a certain quantity of inorganic incombustible material, often referred to by the term "ash," which is separated during the complete or partial combustion of the feedstock. At certain temperatures, the ash may fuse to form agglomerates or "slag". The process by which slag is formed is referred to as "slagging".

Gasifier Design and Operation

Referring now to FIG. 1, the thermal decomposition apparatus 10 includes a gasification zone 103 and a burn-up zone 200. The gasification zone may include one inlet for adding gas (e.g., oxygen containing gas, steam, carbon dioxide), inlet 102; and the burn-up zone may include one inlet for adding gas, inlet 202. The gasification zone 103 receives carbonaceous material feedstock 101. A transfer ram 710 moves a material bed of the feedstock through the thermal decomposition apparatus. A transfer ram face 715 may receive gas (e.g., oxygen containing gas, steam, carbon dioxide) and allow the gas to exit at its face.

A stream of solid ash 205 may be removed from burn-up zone 200. An ash transfer ram 720 may move ash out of the gasifier. An ash transfer ram face 725 may receive gas (e.g., oxygen containing gas, steam, carbon dioxide) and allow the gas to exit at its face. A stream of raw syngas 105 may be removed from the gasification zone 103.

Figure 2:
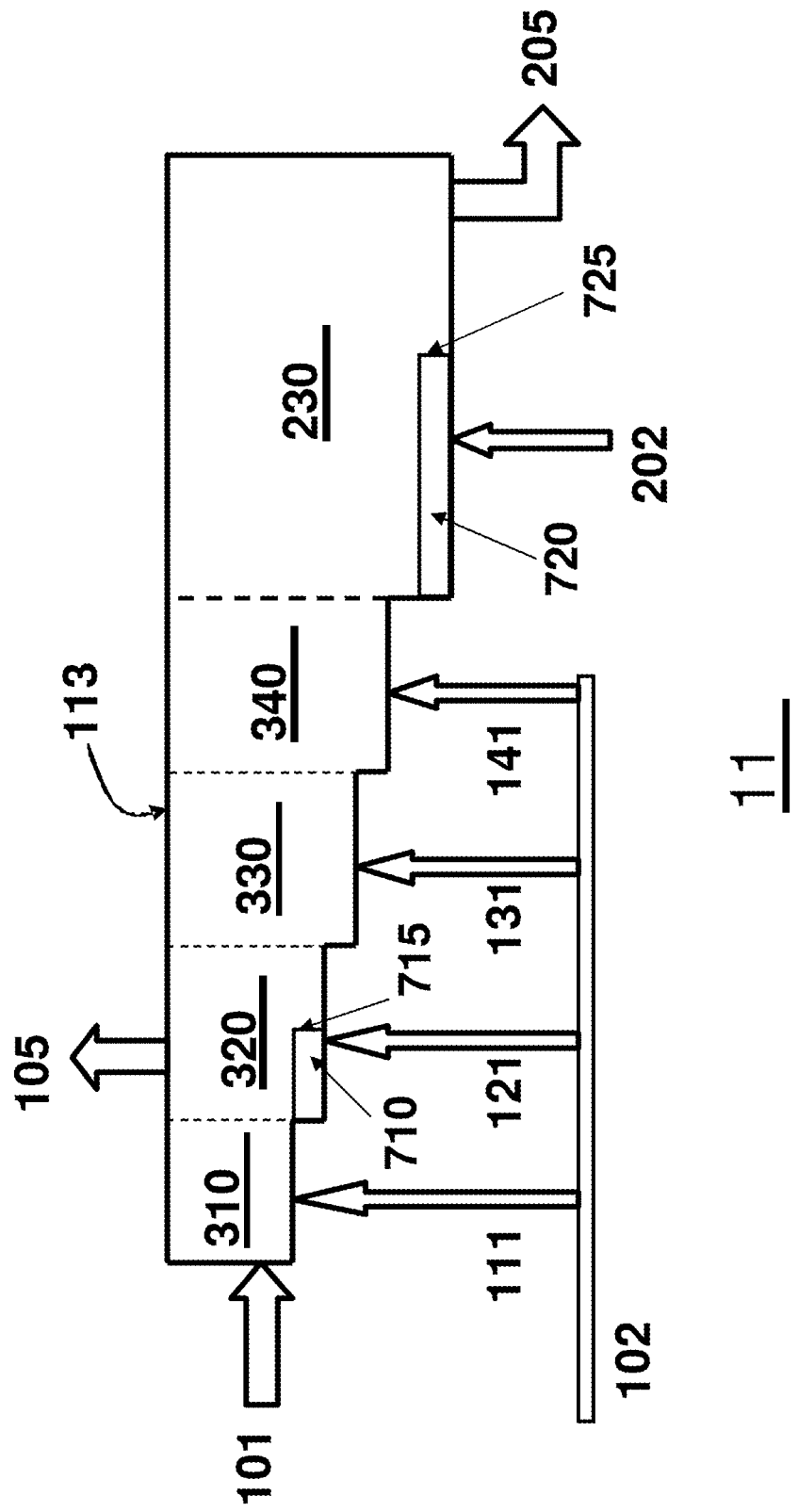
FIG. 2 is a schematic diagram of an aspect of a thermal decomposition apparatus that includes a gasification zone and a burn-up zone wherein the gasification zone includes four sections or hearths.

Referring now to FIG. 2, the gasification-apparatus 11 includes a gasification zone 113 and a burn-up zone 230. As shown in this aspect, the gasification zone 113 includes four gasification hearths: Hearth-I 310, Hearth-II 320, Hearth-III 330, and Hearth-IV 340. In other aspects, the gasification zone may include from 1 to 10 hearths. One or more of the gasification hearths may include a transfer ram 710. A transfer ram face 715 may receive gas and allow the gas to exit at its face.

Each gasification hearth includes one inlet for adding gas: gas inlet 111 to Hearth-I, gas inlet 121 to Hearth-II, gas inlet 131 to Hearth-III, and gas inlet 141 to Hearth-IV. The burn-up zone includes one inlet for adding gas: gas inlet 202. A carbonaceous material feedstock 101 can be added into Hearth-I (entry hearth) of the gasification zone 113. A stream of solid ash 205 can be removed from the burn-up zone 230. An ash transfer ram 720 may be utilized to move ash out of the gasifier. An ash transfer ram face 725 may receive gas and allow the gas to exit at its face. A stream of raw syngas 105 can be removed from the gasification zone 113.

Referring now to FIG. 3, the gasification-apparatus 13 includes a gasification zone 143, a burn-up zone 500, a connecting zone or throat 300 and a tar reduction zone 400. The gasification zone 143 includes five gasification hearths: Hearth-I 110, Hearth-II 120, Hearth-III 130, Hearth-IV 140, and Hearth-V 150. Each gasification hearth includes one inlet for adding gas: gas inlet 611 to Hearth-I, gas inlet 621 to Hearth-II, gas inlet 631 to Hearth-III, gas inlet 641 to Hearth-IV and gas inlet 651 to Hearth-V. The burn-up zone includes one inlet for adding gas: gas inlet 202. The connecting zone or throat 300 includes one inlet for adding gas: gas inlet 301.

A carbonaceous material feed 101 can be added into Hearth-I (entry hearth) of the gasification zone 143. One or more of the gasification hearths may include a transfer ram 710. A transfer ram face 715 may receive gas and allow the gas to exit at its face. A stream of solid ash 205 can be removed from the burn-up zone 500. An ash transfer ram 720 may be utilized to move ash out of the gasifier. An ash transfer ram face 725 may receive gas and allow the gas to exit at its face. A stream of hot syngas 405 can be removed from the tar reduction zone 400.

Figure 4A:
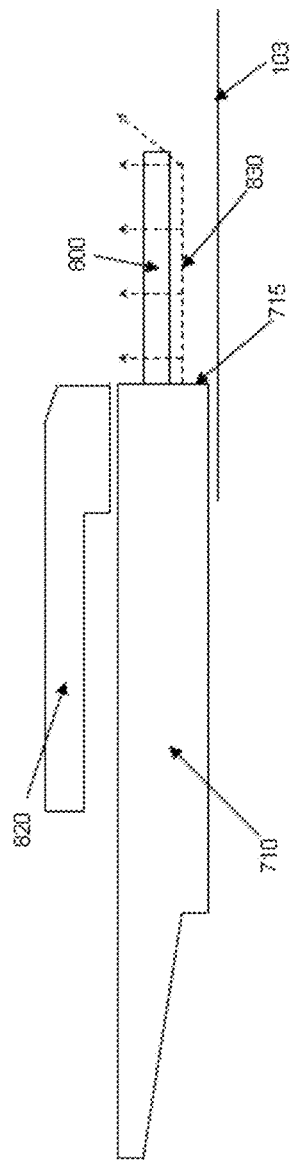
FIG. 4A illustrates a side view of a transfer ram and FIG. 4B illustrates a front view of a face of the transfer ram.

A more detailed side view of an ash ram is shown in FIG. 4A. A gasification zone 103 may include a transfer ram 710. Feed material from feed hearth 820 contacts transfer ram face 715. A poker rod 800 extend away from the transfer ram face 715 and into feed material. The poker rod may create a void in material in front of the transfer ram face 715. Gas introduced under poker rods 800 may diffuse through material in a gas diffusion path 803.

Figure 4B:
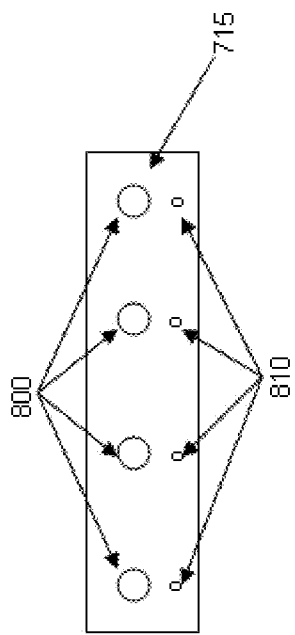

FIG. 4B illustrates a front view of transfer ram 710. The transfer ram 710 include a transfer ram face 715 and poker rods 800 which extend away from the transfer ram face 715. In this aspect, the transfer ram 715 may include from about 1 to about 10 poker rods 800, in another aspect, from about 2 to about 8 poker rods, in another aspect about 3 to about 6 poker rods, and in another aspect about 4 to about 5 poker rods. In another aspect, the transfer ram face 715 may include gas nozzles 810 located generally beneath each poker rod 800.

Figure 5:
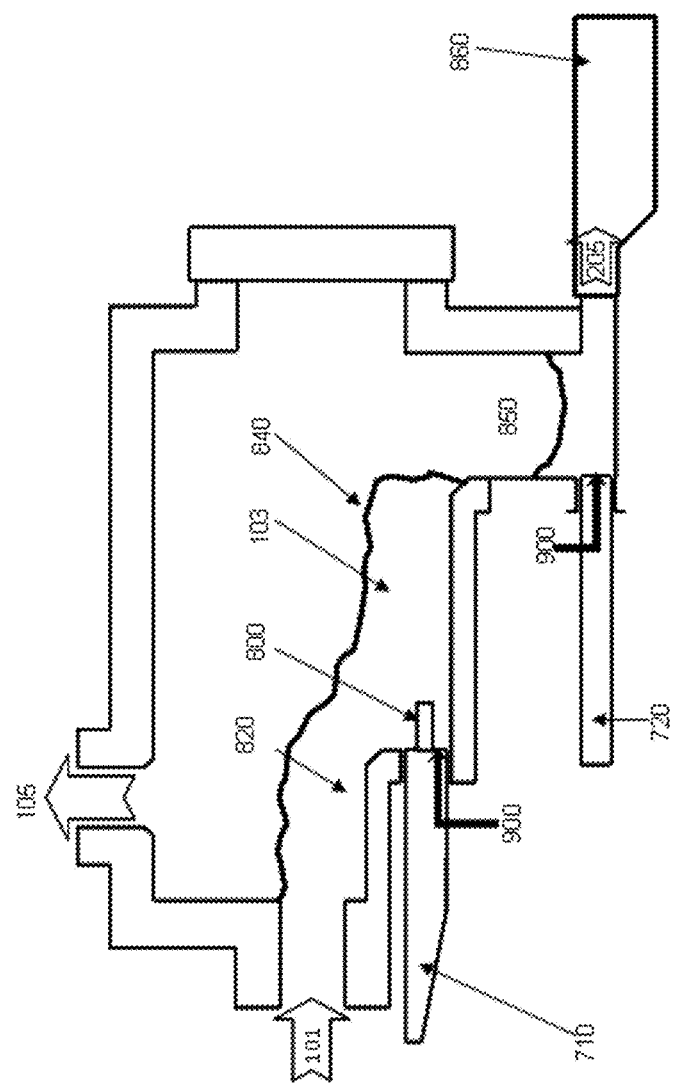
FIG. 5 illustrates material flow through a thermal decomposition unit.

FIG. 5 illustrates more detailed aspects of a thermal decomposition unit 15. In this aspect, feedstock material 101 moves into a feed hearth 820 and then a main hearth of a gasification zone 103. A transfer ram 710 moves material through the gasification zone 103. A poker arm 800 may extend from the transfer ram 710 into the material. Material moves into an ash sump 850. Solid ash 205 is conveyed into an ash receiver 860 by an ash transfer ram 720. In one aspect, feedstock material 101 follows a material path 840 through the thermal decomposition unit 15. In another aspect, gas 900 may be supplied to the transfer ram 710 and/or to the ash transfer ram 720. A stream of raw syngas 105 may be removed from the gasification zone 103.

In one aspect, a moving device is moved at a rate effective for providing a retention time of the feedstock material 101 in the gasification zone 103 of about 0.25 hours to about 3 hours, in another aspect, about 0.25 to about 2 hours, in another aspect, about 0.25 hours to about 1.5 hours, in another aspect, about 0.5 to about 1.25 hours, and in another aspect, about 0.75 to about 1 hour. A moving device may include for example, a transfer ram, screw feed, and combinations thereof. As shown in FIG. 5, the transfer device is a transfer ram 710.

Figure 6:
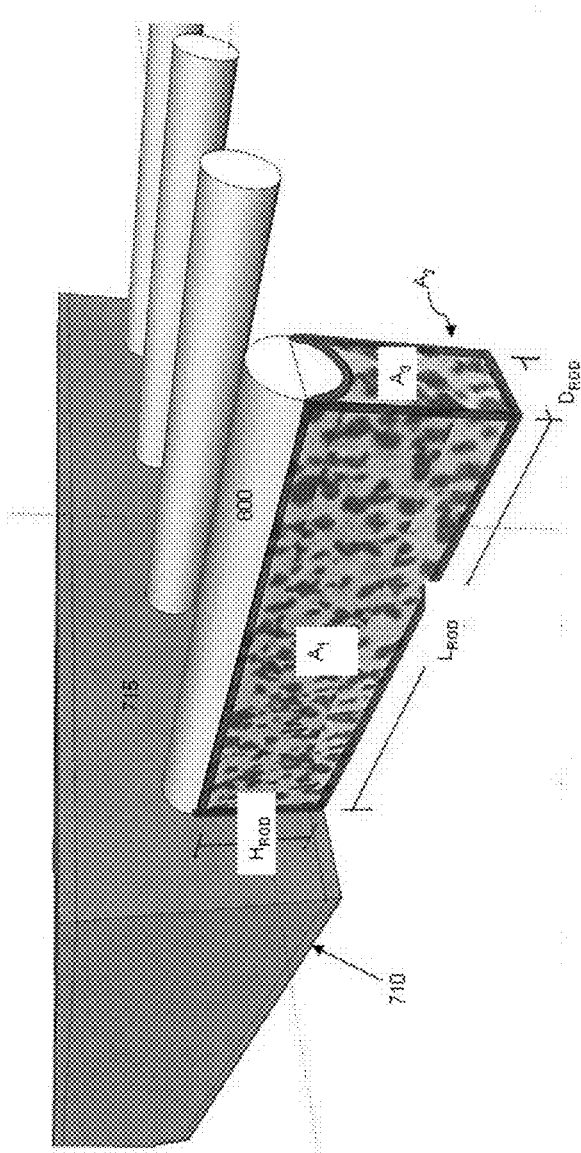
FIG. 6 shows a perspective view of a transfer ram.

A perspective view of the transfer ram is shown in FIG. 6. As shown, the transfer ram 710 includes poker arms 800 extending away from a transfer ram face 715 and extending into feedstock material. The poker arms 800 are effective for creating an effective gas diffusion area in the feedstock material. The effective gas diffusion area may be determined according to the following formula.

$$\text{Effective Gas Diffusion Area} = (A_1 + A_2 + A_3) \times (\text{number of poker arms})$$

where
$A_1 = (H_{ROD}) \times (L_{ROD})$
$A_2 = (H_{ROD}) \times (L_{ROD})$
$A_3 = (H_{ROD}) \times (D_{ROD}) - \frac{1}{2}(\pi D^2_{ROD}/4)$
where $H_{ROD}$ is the height of the poker arm as measured from the bottom of the face of the transfer ram to a midpoint of the poker arm; and
$L_{ROD}$ is the length of the poker arm.

In this aspect, the process is effective for providing an effective gas diffusion area for a single poker arm ($A_1 + A_2 + A_3$) of about 0.1 ft$^2$ to about 0.4 ft$^2$, in another aspect, about 0.125 ft$^2$ to about 0.375 ft$^2$, in another aspect, about 0.15 ft$^2$ to about 0.35 ft$^2$, and in another aspect, about 0.2 ft$^2$ to about 0.3 ft$^2$.

Feedstock:

In accordance with the process, the feedstock material provided to the gasifier forms a moving material bed inside the gasifier. A temperature of the material bed effects slagging. In this aspect, the process is effective for maintaining a material bed temperature not exceeding about 2300° F. at any point in the material bed, in another aspect, the material bed temperature does no exceed about 2200° F., in another aspect, about 2100° F., in another aspect, about 2000° F., in another aspect, about 1900° F., in another aspect, about 1800° F., in another aspect, about 1700° F., in another aspect, about 1600° F., in another aspect, about 1500° F., and in another aspect, the material bed temperature does not exceed about 1400° F. Temperature may be measured by any know methods, including for example the use of thermal couples which are inserted into the material bed. Crude syngas temperature may be measured at a throat section (for example, 300 in FIG. 3).

In various aspects, the material bed has a temperature and crude syngas may have the following temperatures.

| material bed temperature | crude syngas temperature |
| --- | --- |
| about 500° F. to about 2000° F. | about 400° F. to about 1600° F. |
| about 500° F. to about 1700° F. | about 400° F. to about 1400° F. |
| about 600° F. to about 1500° F. | about 500° F. to about 1250° F. |
| about 700° F. to about 1250° F. | about 600° F. to about 1000° F. |
| about 800° F. to about 1000° F. | about 650° F. to about 850° F. |
| about 850° F. to about 950° F. | about 700° F. to about 800° F. |

In another aspect, the material bed has an average temperature of about 800° F. to about 1000° F., in another aspect, about 850° F. to about 950° F., in another aspect, about 875° F. to about 925° F., and in another aspect, about 900° F. Temperature variation across the material bed is less than about 300° F., in another aspect, less than about 250° F., in another aspect, less than about 200° F., in another aspect, less than about 150° F., and in another aspect, less than about 100° F. An average temperature may be determined by measuring material bed temperature at the locations in the material bed indicated below and then averaging those temperatures.

1 to 6 locations at about 2 inches in front of the transfer ram;
1 to 6 locations at about 14 inches in front of the transfer ram;
1 to 6 locations at about 20 inches in front of the transfer ram;

1 to 6 locations at about 26 inches in front of the transfer ram; and 1 to 6 locations at about 32 inches in front of the transfer ram.

Feedstock/Oxygen:

A carbonaceous material feed is introduced into the gasifier. A first molecular oxygen containing gas is supplied to the gasification zone and thus the carbonaceous material feed is treated with molecular oxygen in order to initiate and facilitate chemical transformation of carbonaceous material. A portion of the carbonaceous material feed is gasified produce a first gaseous product. Supply of oxygen into the gasifier is controlled in order to preferentially promote formation of carbon monoxide from carbonaceous material. A sub-stoichiometric amount of oxygen is supplied in order to promote production of carbon monoxide. In one aspect, oxygen is provided to the gasification zone at a rate of about 0.5 to about 1.5 lb-mol/hr-ft$^2$, and in another aspect, about 0.75 to about 1.25 lb-mol/hr-ft$^2$.

In another aspect, oxygen is provided to the gasification zone at a rate effective for providing an $O_2$ to area:carbon ratio of about 0.1 to about 0.5, and in another aspect, about 0.2 to about 0.4. In this aspect, effective ratios were determined according to the following parameters.

Included 4 gas nozzles per transfer ram.
Rod diameter was 0.125 ft.
Rod elevation was 0.167 ft.
Solid feed was 80 lbs/hr.
Carbon % weight was 40.1, or 32.08 lbs/hr, or 2.673 (lb-mol/hr)

| Transfer Ram $O_2$ (lbs/hr) | Transfer Ram $O_2$ (lb-mol/hr) | Transfer Ram Length (ft) | Effective Area (ft$^2$) | $O_2$ to area (lbs/hr-ft$^2$) | $O_2$ to area (lb-mol/hr-ft$^2$) | $O_2$ to carbon (lbs/lbs) | $O_2$ to carbon (mol/mol) |
|---|---|---|---|---|---|---|---|
| 12 | 0.38 | 0.333 | 0.465 | 25.791 | 0.806 | 0.374 | 0.140 |
| 18 | 0.56 | 0.333 | 0.465 | 38.687 | 1.209 | 0.561 | 0.210 |
| 24 | 0.75 | 0.333 | 0.465 | 51.582 | 1.612 | 0.748 | 0.281 |
| 12 | 0.38 | 1.0 | 1.354 | 8.862 | 0.277 | 0.374 | 0.140 |
| 18 | 0.56 | 1.0 | 1.354 | 13.292 | 0.415 | 0.561 | 0.210 |
| 24 | 0.75 | 1.0 | 1.354 | 17.723 | 0.554 | 0.748 | 0.281 |

Additional Gas:

Undesirable hot spots might be created in the thermal decomposition unit in one or more of the gasification zone and the burn-up zone, or hearths contained therein, due to uneven distribution of molecular oxygen containing gas in the carbonaceous material feed. This may cause poor quality in raw syngas produced. Hot spots can also cause localized melting of ash. Formation of hot spots can be reduced or prevented by providing one or more additional gas to the gasification zone and/or the burn-up zone. In this aspect, the additional gas may include $CO_2$, steam, nitrogen, methane, and mixtures thereof. Oxygen and an additional gas are provided at a weight ratio of about 3:1 to about 1:2, and in another aspect, a weight ratio of about 3:2 to about 1:1.

In one aspect, in order to prevent undesirable hot spots, carbonaceous material feed may be treated with steam along with molecular oxygen in the gasification zone. Carbonaceous material feed may be treated with $CO_2$ gas along with molecular oxygen in the gasification zone. Carbonaceous material feed may be treated with steam along with molecular oxygen in the burn-up zone. Carbonaceous material feed may be treated with $CO_2$ gas along with molecular oxygen in the burn-up zone. Thus the first molecular oxygen-containing gas may include one or more of steam and carbon dioxide gas and the second molecular oxygen-containing gas may include one or more of steam and carbon dioxide gas.

Burn-Up Zone:

In one aspect, one or more transfer rams (ash removal rams) are used in the burn-up zone to remove solid ash. Several methods can be employed to remove solid ash out of the burn-up zone. In one aspect, a water seal is used in which an ash removal ram pushes solid ash into a pool of water, using water as a seal in order to minimize, preferably avoid, air leakage into the burn-up zone. The wet ash is then moved out of the water using a conveyor belt. In another aspect, the ash is removed through a lock-hopper system to minimize, preferably avoid air leakage into the burn-up zone. For example double ash doors comprising an upper ash door and a lower ash door can be used to provide the seal. In one aspect, keeping the lower ash door closed to provide a seal, the upper ash door is opened to allow ash to fall downward into a non-combustion zone in which the ash can cool down. In order to remove ash, the upper ash door is closed first to provide the seal and then the lower ash door is opened and an ash removal ram pushes cooled ash out of gasifier. This method removes dry ash and can have advantage if ash has any direct usage as no drying is required prior to such direct usage of ash. In one aspect, feedstock is moved through the burn-up zone at a rate effective for providing a retention time of feedstock in the burn-up zone of about 0.5 hours to about 10 hours, in another aspect, about 0.5 hours to about 8 hours, in another aspect, about 0.5 hours to about 7 hours, in another aspect, about 0.5 hours to about 6 hours, in another aspect, about 0.5 hours to about 5 hours, in another aspect, about 1 hour to about 4 hours, and in another aspect, about 2 hours to about 3 hours.

Raw syngas is produced that may include carbon monoxide (CO) and carbon dioxide ($CO_2$). It is desirable to have more CO and less $CO_2$ in the raw syngas. In one aspect, the $CO/CO_2$ molar ratio in said raw syngas is greater than about 0.75. In one aspect, the $CO/CO_2$ molar ratio in said raw syngas is greater than about 1.0. In one aspect, $CO/CO_2$ molar ratio in said raw syngas is greater than about 1.5. Hot syngas may include carbon monoxide (CO) and carbon dioxide ($CO_2$). It is desirable to have more CO and less $CO_2$ in the hot syngas. In one aspect, the $CO/CO_2$ molar ratio in said hot syngas is greater than about 0.75. In one aspect, the $CO/CO_2$ molar ratio in said hot syngas is greater than about 1.0. In one aspect, $CO/CO_2$ molar ratio in said hot syngas is greater than about 1.5.

In addition to containing non-carbonaceous mineral matter, solid ash may include unconverted carbon or unconverted carbonaceous matter. In one aspect, carbon content of said solid ash is less than about 10 wt %. In one aspect, carbon content of solid ash is less than 5 wt %. In one aspect, ratio of carbon content of solid ash to carbon content of carbonaceous material feed is less than about 0.1. In one aspect, ratio of carbon content of solid ash to carbon content of carbonaceous material feed is less than about 0.01.

The carbon content of ash and carbon content of carbonaceous material feed refers to carbon or a chemical that contains carbon. In this aspect, numerous known techniques may be utilized to measure carbon content. Some examples of techniques that may be used to measure carbon include and are not limited to loss-on-ignition (LOI) tests, thermogravimetric analysis (TGA), laser probe based optical methods, methods using microwave radiation, methods using nuclear magnetic resonance (NMR), and various ASTM methods (see for example ASTM D6316).

EXAMPLES

Example 1

Effect of Oxygen Nozzle Location on Material Bed Temperature Profile

A thermal decomposition unit was operated using Northwest Arkansas oak wood. Bed temperatures were monitored where gas nozzles were located directly under push rod and where gas nozzles were located between push rods. Results were as follows:

| | Temperature (° F.) in front of transfer ram | | | |
|---|---|---|---|---|
| | Previous nozzle configuration ($O_2$ nozzles-between-rods) | | Modified nozzle configuration ($O_2$ nozzles below rods) | |
| *$CO_2$:$O_2$ | Min | Max | Min | Max |
| 0 | 1,800 | >2,300† | 1,300 | 1,800 |
| 0.5 | 1,500 | 2,000 | 1,100 | 1,600 |
| 1 | 1,200 | 1,800 | 1,000 | 1,300 |

Notes:
*Specifies the amount of $CO_2$ that was mixed with $O_2$ ratio prior to injection into the thermal decomposition unit at the transfer ram face nozzles.
†Temperature probe max limit of 2,300° F. was reached so the actual max temp is unknown.

Example 2

Thermal Decomposition of an MSW-Derived Material Source (Trial 1)

An MSW material source was utilized from Palm Beach Renewable Energy Facility 1 (PBREF 1). This was a refuse-derived fuel energy from waste (EfW) facility designed to reduce the volume of waste in Palm Beach County Florida, while generating electricity and recovering metals from the waste stream. This MSW-derived material may be classified as RDF-2 per ASTM E 856.

Raw MSW-Derived Material:

Grab samples from the bulk lot were taken for physical characterization. Sample screening results indicated 51% wt fraction retained by 2" screen so the material was generally larger than 2" size. About 10% wt fraction passed through a ¼" screen indicating that there was a significant amount of small/fine particulates. The following Table shows the relative fractions.

RDF Particle Size Distribution (Note: Percentages are in Wet Basis)

| Screen Size | Mass Retained (%) |
|---|---|
| >2 inches | 51 |
| 1 inch | 18 |
| ½ inch | 12 |
| ¼ inch | 10 |
| <¼ inch | 9 |

As shown in the Table below, the retained fraction from screening with a 2" mesh screen was roughly 41% wt paper and cardboard, 15% wt biomass, 35% wt plastics, 5% wt rubber and latex, and 1% Styrofoam.

Classification of 2-Inch Size

| Classification | Weight Percent (%) |
|---|---|
| Paper & Cardboard | 41 |
| Biomass | 15 |
| Plastic | 38 |
| rigid plastic | 12 |
| stiff plastic | 7 |
| film | 19 |
| Rubber & Latex | 5 |
| Styrofoam | 1 |

Note:
Percentages are on dry basis (assumed paper & cardboard was at 50% MC and Biomass was at 40% MC).

Shredded and Dried MSW-Derived Material:

Two 5-gallon samples were taken and analyzed for particle size and composition. The particle size distribution post-shredding and post-drying is shown below. Material pieces larger than 2 inches nominal size was 20% wt. The 1 inch to 2 inch size fraction had the highest percentage accounting for 28% wt followed by the ½ inch to 1 inch fraction which accounted for 25% wt. The ¼ inch to ½ inch fraction was about 12% wt and the <¼ inch fraction was 15% wt.

MSW Particle Size Distribution Post-Shredding (Note: Percentages are in Wet Basis)

| Screen Size | Mass Retained (%) |
|---|---|
| >2 inches | 20 |
| 1 inch | 28 |
| ½ inch | 25 |
| ¼ inch | 12 |
| <¼ inch | 15 |

Results on manual classification of the 1 inch to 2 inch fractions and the >2 inch fraction are shown in the Table below. There was a higher amount of plastic material in the >2 inch size fraction compared to the 1 inch to 2 inch size fraction. Components that were likely from biogenic sources accounted for about 51% wt of the shredded and dried material. Dispersed objects such as aluminum cans, plates, and frames, glass, and other inorganic pieces were found mixed with the waste but generally in much smaller weight quantities.

Composition of the Different Size Fractions.

| Component | 1 to 2-inch (wt %) | >2-inch (wt %) | >1-inch (wt %) |
|---|---|---|---|
| Paper & Card | 34.6 | 13.9 | 24.2 |
| Biomass | 9.8 | 4.3 | 7.0 |
| Plastic | 26.4 | 58.9 | 42.6 |
| Latex & Rubber | 0.1 | 0 | 0.1 |
| Foam | 2.8 | 0.9 | 1.9 |
| Carpet | 4.5 | 0 | 0.8 |
| Textile | 7.0 | 14.6 | 10.8 |
| Total Combustible | 85.2 | 92.6 | 87.4 |
| Metal & Inert | 12.8 | 2.5 | 7.7 |
| Wire | 0.4 | 4.0 | 2.2 |
| Biogenic Fraction, weight basis | 60 | 35 | 48 |

Note:
The biogenic fraction is based on particle weight and not on a carbon basis.

The properties of the MSW material from PBREF in comparison with the properties of INPB mulch and NWA oak wood are shown in the Table below. The heating value of the MSW material (8,110 BTU/lb) was between that of INPB mulch (7,562 BTU/lb) and that of NWA oak wood (8,427 BTU/lb). Ash content was very high accounting for about 25% of the dry mass. The volatile matter content of the MSW material was relatively lower than that of NWA oak wood and INPB mulch: 63.3% wt for MSW vs 86.2% wt for NWA oak wood and 69.0% for INPB mulch material. The MSW material was high in Cl and S and was measured to be 1.0% wt and 0.3% wt, respectively. The Cl was over hundred-fold that of NWA oak wood and close to five times that of INPB mulch. The S content was about 25 times that of NWA oak wood and twice that of INPB mulch. Potassium and Na levels in the MSW and INPB mulch were fairly close but $N_{Kjeldahl}$ was more than twice as much in the MSW-derived material.

Properties of MSW (PBREF) Compared to INPB Mulch and NWA Oak.

| Property | RDF (PBREF) | INPB mulch | NWA oak wood chips |
|---|---|---|---|
| Ultimate Analysis (dry basis) | | | |
| C (% wt) | 40.080 | 36.170 | 48.590 |
| H (% wt) | 5.400 | 3.930 | 6.310 |
| O (% wt) | 27.000 | 46.610 | 44.270 |
| N (% wt) | 1.040 | 0.970 | <0.500 |
| S (% wt) | 0.298 | 0.151 | 0.012 |
| Cl (% wt) | 0.998 | 0.214 | 0.008 |
| Ash (% wt) | 25.180 | 12.660 | 0.820 |
| K (% wt) | 0.325 | 0.407 | £0.046 |
| Na (% wt) | 0.452 | 0.586 | <0.002 |
| $N_{Kjeldahl}$ (% wt) | 0.626 | 0.265 | 0.078 |
| Proximate Analysis | | | |
| Volatile Matter (% wt) | 63.26 | 68.96 | 86.19 |
| Ash (% wt) | 25.18 | 12.66 | 0.82 |
| Fixed Carbon (% wt) | 9.56 | 18.38 | 12.99 |
| Heating Value (Btu/lb) | 8,110 | 7,562 | 8,427 |

MSW-Derived Material Odor Analysis:

Compounds typically associated with perceived odors were identified and quantified to gauge odor emission levels from drying the MSW-derived material. The dryer exhaust air was sampled and analyzed for compounds with very low odor thresholds. The target compound lists include amines, carboxylic acids, reduced sulfur compounds and odorous volatile organic compounds (VOCs).

Analytical results indicated that the odor was in part due to the presence of carboxylic acids generated by the decomposition of the vegetative components. Low levels of acetic, butyric, caproic, and caprylic acids were found to be present. Amines, ammonia, and reduced sulfur compounds were not detected but trace amounts of hydrocarbons, alcohols, ketone, and acetaldehyde were identified.

Pilot Plant Trials:

Transition to MSW-derived Material: The pilot test was started by slowly easing in the MSW into the process by blending it with NWA oak wood chips. MSW to wood chips blend ratios of 25% wt, 50% wt, 75% wt, then 100% wt were used. Blending was done by mixing the appropriate amounts of MSW and wood chips shredder hopper (Komar Quad Shear Shredder Model QR2224-30, Komar Industries, Inc., Groveport, Ohio).

At 25% wt RDF—75% woodchips, the conveyance of the blended feedstock was fairly continuous except for a couple of instances where the dryer outlet was plugged. On these occasions, the discharge opening of the dryer had to be manually cleared to allow the material to drop.

The frequency of plugging increased after transitioning to 50% wt MSW—50% woodchips blend. This resulted to periods of minor instability in gasifier operation due to the subsequent breaks in feed flow but there was no major operational issue.

At 75% wt MSW—25% woodchips, increased occurrence of conveying problems were encountered. The dryer discharge outlet had to be constantly cleared because of the increased rate of material plugging. Conveyor #4 got stuck because a long, distorted aluminum piece plugged the consequently caused material to pack the area between the conveyor belt and the conveyor cover. Stabilizing the gasifier was very difficult due to constant breaks in solid feed flow.

Modifications were made in the conveying system to address the problems. The feedstock dryer outlet was enlarged by raising the opening by 6 inches; to prevent the material from catching the top side of the discharge outlet. The height of the material on the dryer belt was also set a couple of inches lower to ensure that the material would move unrestricted through the discharge outlet. The distance between the belt and the cover of conveyor #4 was increased by raising the cover height by 4 inches.

Pilot testing using 100% MSW-derived material as feedstock was successfully run with no major operational issue encountered during the length of these test runs. Several adjustments were made within the period of the test runs to find the best combination of operating parameters on the basis of: (i) gasifier operation stability as affected by: draft, bed height, and degree of material aggregation and (ii) syngas quality. Operating parameters included: solid feed rate, length of transfer ram rods/"pokers", transfer ram stroke length, transfer ram stroke interval, ash ram stroke interval, $O_2$ flow rates, and $CO_2$ flow rates.

Transfer ram rod/"poker" length—Using a rod length of 4" (with the $O_2$ nozzles placed below the rods) instead of 12" resulted to better syngas quality. At 12" rod length, the peak average CO was about 25% while at 4" rod length, the peak average CO was about 34%. No significant difference on $H_2$ concentration was observed. The effect on syngas quality can be explained by the higher heat loss from using a long, cooled-rod (larger surface area) compared to a short cooled-rod.

Transfer ram stroke length—Pilot observations indicated that stroking the transfer ram at least 7" (in combination with 1:1 $CO_2:O_2$ flow at the transfer ram nozzles) eliminated the formation of large aggregates on the main hearth. These large aggregates are known to block material flow through the gasifier lower chamber. It appeared that stroking the ram longer than the length of the aggregate formation between ram strokes resulted to 'breaks' between aggregate pieces. The discontinuity brought about by the 'breaks' appeared to have eliminated large aggregate formation.

Transfer ram stroke interval—Stroking the transfer ram every 11 minutes was found satisfactory in maintaining the gasifier main hearth 30%-40% full (height of bed with respect to distance from the hearth floor to the gasifier ceiling), ensuring high utilization. Frequent stroking was also found to have helped improve the stability of syngas quality by inducing a relatively more continuous solid flow through the gasifier.

$CO_2$ flow rate—Bed temperature measurement results showed that the temperature in front of the ram can be kept below the ash fusion temperature of MSW-derived material (2,200° F.) by using a $CO_2$ to $O_2$ flow ratio of 1:1 at the transfer ram nozzles. Using this flow ratio appeared to have helped reduce the severity of aggregation (on the basis of size and hardness). Use of lower $CO_2$ to $O_2$ flow ratios resulted to temperatures above 2,200° F. in the area directly in front of the transfer ram.

Examples of some preferred operating parameters on the basis of gasifier operation stability and syngas quality is summarized below.

| Feed material | 100% MSW-derived material (PBREF) |
| --- | --- |
| Solid feed rate (dried) | 60-80 lbs/hr |
| Transfer ram $O_2$ | 18 lbs/hr |
| Transfer ram $CO_2$ | 18 lbs/hr |
| Transfer ram stroke length | 7 inches |
| Transfer ram stroke interval | 11 minutes |
| Transfer ram rod/'poker' length | 4 inches |
| Ash ram $O_2$ | 10 lbs/hr |
| Ash ram $CO_2$ | 5 lbs/hr |
| Ash ram stroke interval | 180 minutes |

As with other feedstock materials, keeping the gasifier main hearth at 30%-40% full (based on percentage distance from the hearth floor to the gasifier lower chamber ceiling) was found to give the most stable gasifier operation. Keeping the material in the ash sump low, preferably between 30%-50% (based on total height of the sump), minimized the severity of aggregation in the ash sump (i.e., smaller and less number of aggregate pieces).

The estimated gasifier feed utilization when gasifying 100% MSW-derived material was calculated using the equation shown below. Utilization is referred to as the percentage of the total non-ash components in the feed that is converted and leaves the gasifier lower chamber as part of the gas stream. Utilization was calculated using the equation below on the assumption that negligible amount of ash components in the feed goes to the gas product stream.

$$\text{Utilization}(\%) = \frac{\left[F \times \left(1 - \frac{A}{100}\right)\right] - \left[R - \left(F \times \frac{A}{100}\right)\right]}{\left[F \times \left(1 - \frac{A}{100}\right)\right]} \times 100$$

where:

F—average feed rate into the gasifier

A—percent ash in feed

R—average residual rate (residual removed from gasifier)

The following table shows the feed utilization (based on non-ash fraction) on the MSW pilot run. The ash percentage used in the calculation was derived from the results from gasifier residual proximate analysis which appeared to be more consistent with the overall mass balance. Results show that utilization was relatively high (98%).

Percent Solid Feed Utilization.

| Feedstock | Average Feed Rate (lbs/hr) | Ave. Residual Rate (lbs/hr) | Percent Ash in Feed (%) | Utilization (%) |
| --- | --- | --- | --- | --- |
| MSW-derived material | 65 | 14 | *20 | 98 |

Note:
*Percentage ash was estimated based on the ash percentage of the gasifier residual.

Syngas Composition: On dry basis, the average composition of syngas from gasifying 100% MSW-derived material was 34% mol CO, 15% mol $H_2$, 38% mol $CO_2$, and 14% mol $N_2$ (based on the best combination of operating parameters). This was a significant improvement over the initial pilot run on MSW where the best average syngas composition was only 19% mol CO and 10% mol $H_2$. The modification on the configuration of the transfer ram nozzles (i.e., 'nozzle-under-rod' configuration instead of 'nozzle-between-rods') showed significant positive impact on operability and gasification stability when using MSW-derived material as feed and, as a result, made a large improvement on product syngas quality.

Figure 7:
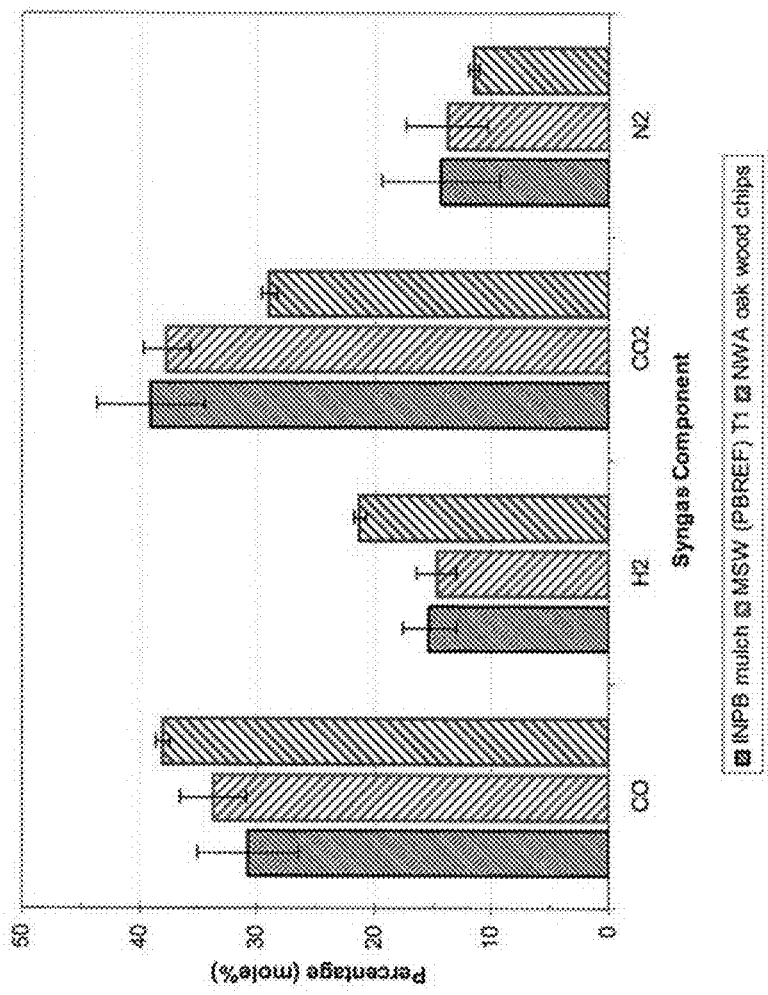
FIG. 7 shows syngas composition derived from different sources.

FIG. 7 shows how the syngas from the MSW-derived material compares with the syngas from gasifying NWA oak wood, both sets of data were derived from using the modified transfer ram nozzle configuration and also with INPD mulch. The CO concentrations of the syngas from two materials were fairly close (about 13% higher in NWA oak wood than MSW). This appeared to be consistent with the characteristics of the two materials where the MSW had slightly lower heating value than NWA oak wood (8,110 BTU/lb vs 8,447 BTU/lb). The $H_2$ level in the syngas from NWA oak was 39% higher than that of the syngas from MSW.

$H_2S$, COS, HCl, and HCN were all detected in the syngas from MSW. The table below shows how the levels compare with those found in the syngas from pine straw mulch and oak wood. The wet scrubber system appeared to have effectively removed the $NH_3$ in the dry-scrubbed syngas. Note that $NH_3$ was detected at high level in the quench water and was not detected in the wet-scrubbed syngas. The removal of HCl and HCN in the wet scrubber system, on the other hand, appeared to have been limited.

Syngas Components

| Component | MSW-derived material (PBREF) | Pine Straw Mulch | NWA oak wood chips |
|---|---|---|---|
| $H_2S$ (ppm) | 126 | 94.5 | 3.2 |
| COS (ppm) | 47.8 | 37.8 | 14.3 |
| HCN (ppm) | 3.64 | ND (<1.73) | ND (<2.53) |
| HCl (ppm) | 1.85 | 3.88 | ND (<1.35) |
| $NH_3$ (ppm) | ND (<0.624) | ND (<0.69) | ND (<1.19) |

Components in Quench Water.

| Component | MSW-derived material (PBREF) |
|---|---|
| $NH_3$ (mg/mL) | 0.3 |
| HCl (ug/mL) | 36.8 |
| HCN (ug/mL) | 6.6 |

Organic compounds were tentatively identified in the syngas from MSW. Similar to the syngas from gasifying NWA oak wood chips, the treated syngas from MSW had trace amounts of hydrocarbon compounds. A wider variety of compounds were tentatively identified to have been stripped from the syngas into the wet scrubber water.

Inspection of gasifier and downstream ducting, piping, and equipment: No apparent damage to the gasifier was observed. There was some scaling (looked like hardened tar) on the transfer ram face and mostly at the base of the rods but these deposits easily peeled off during cleaning. The transfer ram metal surfaces and welds appeared to be intact; without any signs of cooling water leakage. All oxygen nozzles were clear.

No major blockage was found along the ducting and downstream equipment. The ducting from the gasifier upper chamber to the syngas cooler was clear. There were particulate deposits on the inner lining of the horizontal duct but nothing unusual in terms of the amount that had deposited. Compositional analyses showed that deposit was a very complex mixture. Significant phases included 28% anhydrous $CaSO_4$, 23% NaCl (also 6% KCl), 18% of a zinc salt, $K_2ZnCl_4$, and 15% of a firebrick-related Ca—Al—Si mineral.

All (total of four) of the syngas cooler tubes were clear. There were some soot and crystalline deposits on the inlet face but very minimal. The inner surfaces of the cold-gas recycle line was covered with soot and layered over with some crystalline material. The deposit was found to contain 61% $NH_4Cl$ and 36% of an iron salt, $(NH_4)_2FeCl_5$, $H_2O$, plus a few percent of NaCl. There were no other crystalline phases although there was some amorphous content. The additional elements observed (e.g., sulfur) may be in amorphous phase.

Example 3

Thermal Decomposition of an MSW-Derived Material Source (Trial 2)

A second pilot trial on the MSW-derived material from PBREF was conducted: (i) to determine the repeatability of results from using the best set of operating parameters found in Pilot Test Trial 1 and (ii) to evaluate the stability of the process over a longer run time (7 days).

No significant difference was observed between the MSW material that was received and used in Example 2 and the second batch of MSW material from PBREF that was used in this Example as both mainly comprised of paper, cardboard, plastics, and biomass.

RDF ASTM Category:
The MSW-derived material from PBREF is considered to be an RDF-2 material based on ASTM E 856 applicable categories. The MSW-derived material from PBREF is considered to be an RDF-2 material based on ASTM E 856 applicable categories.

Particle Size Distribution (PSD):
A total of six (6) five-gallon samples were collected to evaluate the particle size distribution of material going into the pilot plant gasifier. Each sample volume was collected, by pilot plant personnel, from material falling into the feed hopper to the gasifier, which is after the solid feed dryer. The particles had been dried to less than 5 percent moisture (average 2.3% wt). The sample volume was collected over a period of time so as to not significantly disrupt the feed rate to the gasifier.

The particle size distribution of the second batch of MSW-derived material is shown in the Table below. Material pieces larger than 2 inches nominal size was 19% wt. The combined ½ inch to 1 inch and 1 inch to 2 inch size fractions accounted for half of the shredded, dried material, each fraction at 25% wt. The ¼ inch to ½ inch fraction was about 16% wt and the <¼ inch fraction was 15% wt. These results were very close to the particle size distribution results of the material used in the first pilot trial.

| Particle Size Distribution Sizes | Average (wt %) | Standard Deviation (wt %) |
|---|---|---|
| >2 inches (<50 mm) | 19 | 8.0 |
| 1 to 2 inches (25 to 50 mm) | 25 | 2.6 |
| ½ to 1 inches (13 to 25 mm) | 25 | 4.0 |
| ¼ to ½ inches (6 to 13 mm) | 16 | 2.0 |
| <¼ inches (<6 mm) | 15 | 2.2 |

Classification of components and biogenic fraction: The biogenic fraction of the shredded, dried material greater than 1 inch particle sizes was determined using the Manual Sorting method in accordance to EN 15440 Standard. Sub-samples from the particle size distribution assessment were used to evaluate the fractions that were biogenic, non-biogenic and inert (metals, rocks, etc.). After sieving, the particles larger than 2-inches and the particles 1 to 2 inches were each manually and visually evaluated.

Plastic particles were segregated by what appeared to be different types of plastic. Where possible, particles were manually separated into basic material type. No further analytical assessment was conducted on the plastic particles to determine the type of plastic. Textiles were segregated between what appeared to be natural (caftan/wool/leather) vs what appeared to be natural (caftan/wool/leather) vs what appeared to be synthetic (carpet, polyesters, etc.).

The Table below shows a quantitative comparison of the classifiable components in the shredded and dried MSW-derived material (Example 2 MSW compared to Example 1 MSW). Results indicate that the two separate batches of MSW-derived material from PBREF were fairly similar. Consistent with the characteristics of the MSW used in Example 21, the MSW used in Example 3 showed more plastics in the >2 inches fraction and more paper and cardboard components were found in the 1 inch to 2 inches size fraction.

The total biogenic fraction (based on percentage weight of components that are likely from biogenic sources—biomass/wood, paper and cardboard, and textile) of the MSW used in Example 3 was about 61% wt for the 1 inch to 2 inches size range and 34% wt for the 2 inches and larger fraction, which is fairly similar to the biogenic fraction found in the MSW used in Example 2.

|  | Example 3 MSW | | | | Example 2 MSW | |
|---|---|---|---|---|---|---|
| Basic | 1 to 2-inch | | >2-inch | | 1 to | |
| Material Categories | Average (wt %) | SD (wt %) | Average (wt %) | SD (wt %) | 2-inch (wt %) | >2-inch (wt %) |
| Plastic | 23.9 | 3.9 | 38.1 | 10.7 | 26.4 | 58.9 |
| Wrappers | 0.3 | 0.4 | 1.9 | 2.8 | ND | ND |
| Foam & Styrofoam | 1.5 | 0.6 | 0.6 | 1.0 | 2.8 | 0.9 |
| Textile, synthetic | 4.2 | 2.8 | 4.1 | 3.7 | 4.5 | 0.0 |
| Rubber/Latex | 2.0 | 2.0 | 14.6 | 11.9 | 0.1 | 0.1 |
| Fuzz | 3.1 | 1.4 | 3.5 | 1.8 | ND | ND |
| Biomass/Wood | 15.9 | 4.2 | 16.4 | 18.5 | 9.8 | 4.3 |
| Paper & Card | 40.8 | 6.7 | 11.4 | 4.1 | 34.6 | 13.9 |
| Textile | 4.7 | 1.8 | 6.0 | 5.3 | 7.0 | 14.6 |
| Metal | 3.7 | 1.6 | 3.4 | 5.6 | 12.8 | 2.5 |
| Wires | 0.0 | 0.0 | 0.0 | 0.0 | 0.4 | 4.0 |
| Total Biogenic Fraction | 61.4 | | 33.8 | | 51.4 | 32.8 |

Notes:
SD—Standard Deviation;
ND—Not Determined

The biogenic fraction is based on percentage weight of components that are likely of biogenic origin and not a carbon basis.

Properties of the MSW-derived material: The properties of the MSW-derived material that was used in Example 3 in comparison to that used in Example 2 are shown in the Table below. The C, H, O, N, and S content were very similar on a dry, ash-free basis. The C content was about 52.5% wt for Example 2 and about 53.6% for Example 1. The H content was 7.5% for Example 2 and about 7.2% for Example 1. The O content was 37.6% for Example 2 and about 36.1% for Example 1. The N content was 1.1% for Trial 2 and about 1.4% for Example 1. Sulfur content was about 0.4% for both trials. The only exception was Cl content where the material used in the second trial appeared to have had less than half that in the MSW used in Example 2.

|  | MSW (PBREF) | | | |
|---|---|---|---|---|
|  | Example 2 | | Example 3 | |
| Property | (dry basis) | (dry, ash-free basis) | (dry basis) | (dry, ash-free basis) |
| Ultimate analysis | | | | |
| C (% wt) | 40.08 | 53.57 | 44.83 | 52.54 |
| H (% wt) | 5.40 | 7.22 | 6.43 | 7.54 |
| O (% wt) | 27.00 | 36.09 | 32.11 | 37.63 |
| N (% wt) | 1.04 | 1.39 | 0.95 | 1.11 |
| S (% wt) | 0.30 | 0.40 | 0.32 | 0.38 |
| Cl (% wt) | 1.00 | 1.33 | 0.45 | .0.53 |
| Ash (% wt) | 25.18 | — | 14.67 | — |
| K (% wt) | 0.32 | | 0.24 | |
| Na (% wt) | 0.45 | | 0.66 | |
| $N_{kjeldahl}$ (% wt) | 0.63 | | 0.96 | |
| Proximate Analysis | | | | |
| Volatile Matter (% wt) | 63.26 | | 71.70 | |
| Ash (% wt) | 25.18 | | 14.67 | |
| Fixed Carbon (% wt) | 09.56 | | 13.63 | |
| Heating Value (Btu/lb) | 8,110 | | 8,456 | |
| Bulk Density (lbs/yd$^3$) | 256 | | 280 | |

Based on grab samples taken for external lab analyses, the ash content of the MSW used in Example 3 was lower than that of the MSW used in Example 2, which was 15% wt vs 25% wt, respectively. This may explain, for the most part, the difference in the volatile matter content, fixed carbon content, and heating value (on a dry basis) between the two separate batches of MSW that were used in pilot trials.

Gasifier Operation:

The gasifier operating parameters used in Example 3 were based on the best combination of parameters (on the basis of gasifier operation stability and syngas quality) that was identified from the tests in Example 2. These gasifier operating parameters are shown in the Table below.

Gasifier Operating Parameters

| Feed material | 100% MSW-derived materials (PBREF) 2$^{nd}$ Batch |
|---|---|
| Solid feed rate (dried) | 60-80 lbs/hr |
| Transfer ram O$_2$ | 18 lbs/hr |
| Transfer ram CO$_2$ | 18 lbs/hr |
| Transfer ram stroke length | 7 inches |
| Transfer ram stroke interval | 11 minutes |
| Transfer ram rod/"poker" length | 4 inches |
| Ash ram O$_2$ | 10 lbs/hr |
| Ash ram CO$_2$ | 5 lbs/hr |
| Ash ram stroke interval | 180 minutes |

This trial was concluded after eight days of continuous run. No major operational issue was encountered for the duration of the test except for the latter part where there appeared to be some flow limitation downstream of the gasifier. Post-trial evaluation of downstream equipment showed that the syngas-bicarbonate mixer, which is setup right before the baghouse, had accumulated material at a level enough to cause flow restriction. The gas velocity through the mixer was too low to carry the particulates out from the mixer vessel and into the baghouse unit. The accumulated material appeared to be a combination of bicarbonate and soot.

Material aggregation was observed inside the gasifier lower chamber but it was not severe enough to cause any bridging or blockage. Aggregation was observed on both main hearth and ash sump. It appeared that maintaining at least 7" transfer ram strokes was sufficient to limit the length of the aggregated material formation.

Feed Utilization:

The Table below shows the feed utilization (based on non-ash fraction) that was achieved in the second pilot trial. The ash percentage used in the calculation was derived from the results from gasifier residual proximate analysis instead of the solid feed analysis because it was more consistent with the overall mass balance. Results show that utilization was relatively high. Roughly 98% of the non-ash component of the solid feed was gasified.

Percent Solid Feed Utilization.

| Feedstock | Average Feed Rate (lbs/hr) | Ave. Residual Rate (lbs/hr) | Percent Ash in Feed (%) | Utilization % |
|---|---|---|---|---|
| MSW-derived material (PBREF) | 70 | 17.5 | *24.4 | 98 |

*Percentage ash was estimated based on he percentage of the gasifier residual.

Syngas Composition:

On a dry basis, the 7-day average composition of syngas from gasifying 100% MSW-derived material was 32% mol CO, 14% mol $H_2$, 36% mol $CO_2$, and 18% mol $N_2$. The syngas composition results from Example 2 were not significantly different from the best results from Example 2.

$H_2S$, COS, HCl, and HCN were all detected in the syngas post-quenching, consistent with the results from Example 2. Generally, the levels were higher in Example 3 compared to Example 2 except for HCl, which was not detected in Example 3. $NH_3$ appears to have been effectively removed in the wet scrubber as it was not detected in the quenched syngas.

| Component | Example 3 | Example 2 |
|---|---|---|
| $H_2S$ (ppm) | 306 | 126 |
| COS (ppm) | 55.6 | 47.8 |
| HCN (ppm) | 6.51 | 3.64 |
| HCl (ppm) | ND (<1.45) | 1.85 |
| $NH_3$ (ppm) | ND (<0.74) | ND (<0.62) |

A fraction of the total HCN in the syngas was removed in the wet scrubber system. The quench water HCN concentration was 9.79 ug/ml.

| | MSW-derived material (PBREF) | |
|---|---|---|
| Component | Example 3 | Example 2 |
| $NH_3$ (ug/mL) | 152 | 302 |
| HCl (ug/mL) | 39.90 | 36.80 |
| HCN (ug/mL) | 9.79 | 6.60 |

Organic compounds were also tentatively identified to be present in the syngas in Example 3, which included 2 methyl-1-propene and benzene. Benzene, toluene, ethylbenzene, and xylene (BTEX) were specifically quantified. Benzene was at 852 ppbv and toluene and xylene were not detected. Ethylene was detected at 12.9 ppm. A wider variety of compounds were tentatively identified to have been stripped from the syngas into the wet scrubber water including acetaldehyde, hexane, benzene, xylene, and methylethyl benzene.

Inspection of gasifier and downstream ducting, piping, and equipment: No apparent damage to the gasifier was observed. There was scaling (looked like hardened tar) on the transfer ram face and at the base of the rods but these deposits easily peeled off during cleaning. The transfer ram metal surfaces and welds appeared to be intact; without any signs of cooling water leakage. All oxygen nozzles were clear. No blockage was found along the ducting from the upper chamber to the inlet of the syngas cooler. The horizontal duct to the syngas cooler was clear but there were some yellowish deposits on the ceramic lining. The deposits appeared to be the same complex mixture that was found lining the ducting in Example 1, comprising of $CaSO_4$, NaCl, KCl, zinc salt, $K_2ZnCl_4$, firebrick-related Ca—Al—Si mineral.

The syngas cooler tubes were clear except for one, which appeared to have been covered with a 'flake' that had fallen from the duct above. This may have contributed to the flow issue that occurred during the latter part of the trial run. This issue was likely associated with the location of the cold-gas recycle point, which is directly above the syngas cooler inlet. There were some soot and crystalline deposits on the inlet face of the syngas cooler. The thickness of deposit appeared typical for the length of gasification trial, as would be found on wood runs.

Most of the inner surfaces of the baghouse cell plate and cover plate and outlet spool were covered with crystalline deposit. Compositional analysis showed the deposit was almost entirely $NH_4Cl$ with traces of Fe oxides. The presence of $NH_4Cl$ downstream of the baghouse indicated that HCl was not being effectively removed by the dry scrubber system. This is likely linked to the fact that the sodium bicarbonate did not have sufficient contact with the syngas as it tended to mostly just settle at the bottom of the mixer vessel due to low gas stream velocity and was not getting carried over into the baghouse.

Effect of MSW Syngas on Fermentation:

A steady state fermenter was established on woodchip syngas before switching to RDF syngas. Over the course of MSW gas fermentation (~200 hours), fermenter showed an initial decline on both hydrogen conversion and ethanol production, then stabilized at lower ethanol productivity (10% less than at starting point), and finally the fermenter gradually improved all the way back up. The key performance indicators (gas conversion, ethanol productivity, specific hydrogen uptake) at the end point showed no significant difference from the starting point.

Example 4

Evaluation of Slagging Potential for RDF Type Material

Feedstock was prepared by mixing 80:20 weight ratio of densified engineered fuel (dPEF) pellets (Lundell Enterprises, Inc.) and Northwest Arkansas wood chips (WC) in batches and passing the mixture through a shredder to make a refuse derived fuel (RDF). The composition included the following components:

| | dPEF pellets | WC | 80:20 blend of ground dPEF and WC |
|---|---|---|---|
| Ultimate Analysis | | | |
| C (% wt) | 41.82 | 48.72 | 43.20 |
| H (% wt) | 5.60 | 6.13 | 5.71 |
| O (% wt) | 40.11 | 44.27 | 40.94 |
| N (% wt) | <0.50 | <0.50 | <0.50 |
| S (% wt) | <0.50 | <0.50 | <0.50 |
| Cl (% wt) | 0.08 | 0.01 | 0.07 |
| Ash (% wt) | 11.57 | 0.82 | 9.42 |
| Proximate Analysis | | | |
| Volatile Matter (% wt) | 75.50 | 86.19 | 77.64 |
| Ash (% wt) | 11.57 | 0.82 | 9.42 |
| Fixed Carbon (% wt) | 12.93 | 12.99 | 12.94 |
| Heating Value (Btu/lb) | 7224 | 8427 | 7464 |

Feedstock material was feed to a gasifier according to the following starting parameters.

| Transfer ram face oxygen | | |
|---|---|---|
| O₂ flow rate | 7.5 | lbs/hr |
| CO₂ flow rate | 16.0 | lbs/hr |
| Ash ram face oxygen | | |
| O₂ flow rate | 18.0 | lbs/hr |
| CO₂ flow rate | 16.0 | lbs/hr |
| Transfer ram | | |
| Stroke interval | 7.0 | minutes |
| Stroke length | 6.0 | inches |
| Ash ram | | |
| Stroke interval | 60.0 | minutes |

Operating parameters of the gasifier were varied and visual inspection of the gasifier provided the following results.

| Solid Feed Rate (lb/hr) | O₂ Feed Rate Transfer Ram Face (lb/hr) | O₂ Feed Rate Burn Out Pan (lb/hr) | CO₂ Feed Rate Transfer Ram Face (lb/hr) | CO₂ Feed Rate Burn Out Pan (lb/hr) | Transfer Ram Stroke Length (in) | Transfer Ram Interval (min) | Ash Ram Stroke Interval (min) | Observation |
|---|---|---|---|---|---|---|---|---|
| 80.0 | 7.5 | 18.0 | 16.0 | 16.0 | 10.0 | 8.0 | 90.0 | No slagging |
| 80.0 | 7.5 | 18.0 | 8.0 | 16.0 | 10.0 | 8.0 | 120.0 | No slagging |
| 80.0 | 7.5 | 16.0 | 4.0 | 16.0 | 10.0 | 8.0 | 120.0 | No slagging |
| 80.0 | 7.5 | 16.0 | 0.0 | 16.0 | 10.0 | 9.0 | 120.0 | No slagging |
| 100.0 | 12.0 | 16.0 | 12.0 | 16.0 | 10.0 | 9.0 | 120.0 | No slagging |
| 100.0 | 16.0 | 16.0 | 16.0 | 16.0 | 10.0 | 9.0 | 120.0 | No slagging |
| 100.0 | 16.0 | 14.0 | 8.0 | 14.0 | 10.0 | 10.0 | 180.0 | Material fusion on hearth |

Example 5

Gasification of Feedstock Material

Feedstock

The following feedstocks were used:

JBT: blend of 20% wood, 40% cardboard, 40% office paper (dry weight basis)

VES: blend of 80% fuel cubes (Lundell Enterprises), 20% wood (dry weight basis)

The JBT was prepared in two blends, A and B. JBT mix A incorporated wood that was screened to remove fine particles. Screening was done using a 3/8 inch trammel screen. JBT mix B incorporated ground wood that had not been screened. Both mixes included wood chips (hardwood) to enhance wood particle size.

The VES mixture was prepared using process engineered fuel cubes that were shredded. The shredded engineered fuel cubes (80%) were then mixed with unscreened ground wood (20%). Wood chips were added to enhance the wood particle size. Feedstock compositions were as follows:

| | Ground wood - Screened (lbs) | Ground wood - unscreened (lbs) | Wood chips (lbs) | Paper (lbs) | Card-board (lbs) | Fuel Cubes (lbs) |
|---|---|---|---|---|---|---|
| JBT-A | 1500 | 0 | 500 | 4000 | 4000 | |
| JBT-B | | 1500 | 500 | 4000 | 4000 | |
| VES | | 1500 | 500 | | | 8000 |

Analysis was performed on each of the feedstock components. Results were as follows:

| | Shredded paper | Shredded cardboard | Fuel cubes | Ground and screened wood | Ground wood with fines | Wood chips |
|---|---|---|---|---|---|---|
| Ultimate Analysis | | | | | | |
| C (% wt) | 39.51 | 46.51 | 41.82 | 52.72 | 53.05 | 49.48 |
| H (% wt) | 5.20 | 5.85 | 5.60 | 5.08 | 5.74 | 5.51 |
| O (% wt) | 46.28 | 45.88 | 40.11 | 41.45 | 40.65 | 43.13 |
| N (% wt) | <0.50 | <0.50 | <0.50 | <0.50 | <0.50 | <0.50 |
| S (% wt) | <0.05 | 0.02 | <0.05 | <0.05 | <0.05 | 0.01 |
| Cl (% wt) | 0.33 | 0.02 | 0.08 | 0.01 | 0.02 | 0.00 |
| Ash (% wt) | 8.69 | 1.54 | 11.57 | 0.74 | 0.54 | 1.52 |
| Proximate Analysis | | | | | | |
| Volatile Matter (% wt) | 75.27 | 82.74 | 75.50 | 85.65 | 85.42 | 86.19 |
| Ash (% wt) | 8.69 | 1.54 | 11.57 | 0.74 | 0.54 | 1.52 |
| Fixed Carbon (% wt) | 12.84 | 15.72 | 12.93 | 13.61 | 14.04 | 12.99 |
| Heating Value (Btu/lb) | 6174 | 8151 | 7224 | 8544 | 8850 | 8427 |

Calculated analysis of the feedstock blend was as follows:

| Components | JBT-A | JBT-B | VES |
|---|---|---|---|
| C (% wt) | 44.55 | 44.60 | 44.07 |
| H (% wt) | 5.43 | 5.53 | 5.79 |
| O (% wt) | 45.00 | 44.88 | 40.11 |
| N (% wt) | 0.50 | 0.50 | 0.50 |
| S (% wt) | 0.11 | 0.11 | 0.50 |
| Cl (% wt) | 0.14 | 0.14 | 0.07 |
| Ash (% wt) | 4.28 | 4.25 | 9.41 |

Gasifier Operation

For each feedstock, the gasifier was operated to maintain a steady bed height and optimize CO composition.

JBT-A:

Feed rate to the gasifier was initially set at about 80 lbs/hr. The oxygen flow at the transfer ram face was set at 16 lbs/hr and the throat oxygen was about 33 lbs/hr. No oxygen flow was provided at the ash sump initially. The transfer ram was set to stroke by 6 inches every 25 minutes.

Gasifier operating parameters were adjusted to achieve a steady syngas composition and a steady material bed in the gasifier. A transfer ram stoke of 10 inches every 8 minutes and oxygen flow settings of 18 lbs/hr at the transfer ram face and 12 lbs/hr at the ash sump provided stable operation.

During early stages of testing, some large pieces of slag were found in the gasifier residual. To reduce this slagging, 8 lb/hr of $CO_2$ was feed with oxygen at the transfer ram face. The amount of slag decreased after $CO_2$ addition. The quantity of slag formed did not cause any problems in the gasifier.

JBT-B:

Feed rate to the gasifier was initially set at about 80 lbs/hr. The oxygen flow at the transfer ram face was set at 18 lbs/hr and the throat oxygen was about 42 lbs/hr. No oxygen flow was provided at the ash sump initially. The transfer ram was set to stroke by 10 inches every 25 minutes.

Gasifier operating parameters were adjusted to achieve a steady syngas composition and a steady material bed in the gasifier. A transfer ram stoke of 10 inches every 10 minutes and oxygen flow settings of 18 lbs/hr at the transfer ram face and 10 lbs/hr at the ash sump provided stable operation.

During early stages of testing, some large pieces of slag were found in the gasifier residual. To reduce this slagging, 8 lb/hr of $CO_2$ was feed with oxygen at the transfer ram face. The amount of slag decreased after $CO_2$ addition. The quantity of slag formed did not cause any problems in the gasifier.

Fines did not have any detrimental effect on gasifier operation. There was not distinct difference between the material bed when using JBT-A (without fines) and JBT-B (with fines).

VES:

Feed rate to the gasifier was initially set at about 80 lbs/hr. The oxygen flow and carbon dioxide flow at the transfer ram face was initially set at 18 lbs/hr and 8 lbs/hr, respectively. Oxygen flow to the throat was about 40 lbs/hr and oxygen flow to the ash sump (ash ram face) was set initially at 10 lbs/hr. The transfer ram was set to stroke by 10 inches every 25 minutes.

During gasifier operation, slag tended to form on the main hearth (within the outer-most bed pokers). Slag pushed by the transfer ram extended over the ash sump and prevented material from falling into the sump, resulting in uneven distribution of material.

During gasifier operation, large pieces of slag obstructed the ash ram and prevented forward or reverse movement. Carbon dioxide flow to the transfer ram and ash ram were increased to 16 lbs/hr and 8 lbs/hr, respectively, but the increases in $CO_2$ were not sufficient to prevent slagging.

Oxygen and $CO_2$ flow settings for each of the feedstock materials can be summarized as follows:

Gasifier settings for each of the feedstock materials can be summarized as follows:

| Feedstock | Transfer Ram Stroke Length (in) | Transfer Ram Stroke Cycle (min) | Ash Ram Stroke Cycle (hr) |
|---|---|---|---|
| JBT-A | 10 | 8 | 5 |
| JBT-B | 10 | 10 | 5 |
| VES | 5 | 15 | 4 |

Syngas compositions were as follows for each of the feedstock materials. (Results reflect syngas composition after filtration, wet scrubbing and drying, and after correction for nitrogen purge used in system cleanout.)

| Feedstock | % CO | % $H_2$ | % $CO_2$ | % $N_2$ |
|---|---|---|---|---|
| JBT-A | 38 | 19 | 40 | 3 |
| JBT-B | 39 | 22 | 36 | 3 |
| VES | 38 | 18 | 36 | 7 |

An estimate of the gasifier feed utilization was calculated using the following equation.

$$\text{Utilization}(\%) = \frac{\left[F \times \left(1 - \frac{A}{100}\right)\right] - \left[R - \left(F \times \frac{A}{100}\right)\right]}{\left[F \times \left(1 - \frac{A}{100}\right)\right]}$$

where F=average feed rate into the gasifier

A=percent ash in the feed

R=average residual rate (residual removed from gasifier)

Utilization is referred to as the percentage of the total non-ash components in the feed that is converted and leaves the gasifier lower chamber as gas. The calculation is based on the assumption that negligible amounts of ash components in the feed leaves the gasifier with the gas product stream.

Utilization for each feedstock was as follows. The average feed rate and average residual rate were calculated based on operation data. The non-ash component in the residual was calculated based on the assumption that the total ash in the residual is equivalent to the total ash in the feed.

| Feedstock | Feed Rate (lbs/hr) | Ash in Feed (wt %) | Avg. Residual Rate (lbs/hr) | Utilization (%) |
|---|---|---|---|---|
| JBT-A | 83.04 | 4.28 | 8.10 | 94.28 |
| JBT-B | 88.85 | 4.25 | 4.40 | 99.27 |
| VES | 78.79 | 9.41 | 8.81 | 98.04 |

| Feedstock | Gasifier Feed Rate (lbs/hr) | Oxygen feed rate main Hearth (lbs/hr) | Oxygen feed rate ash sump (lbs/hr) | Oxygen feed rate throat (lbs/hr) | Oxygen feed rate total (lbs/hr) | $CO_2$ feed rate main hearth (lbs/hr) | $CO_2$ feed rate ash sump (lbs/hr) | $CO_2$ feed rate total (lbs/hr) |
|---|---|---|---|---|---|---|---|---|
| JBT-A | 80 | 18 | 12 | ~40 | 70 | 8 | 0 | 8 |
| JBT-B | 80 | 18 | 10 | ~40 | 68 | 8 | 0 | 18 |
| VES | 80 | 18 | 12 | ~44 | 74 | 16 | 8 | 24 |

Ash balance was as follows:

| Feedstock | Feed Average Feed Rate (lbs/hr) | Feed Percent Ash (% wt) | Feed Ash Rate (lbs/hr) | Gasifier Residual Average Removal Rate (lbs/hr) | Gasifier Residual Percent Ash (% wt) | Gasifier Residual Ash Rate (lbs/hr) | Ash Difference (lbs/hr) |
|---|---|---|---|---|---|---|---|
| JBT-A | 83.04 | 4.28 | 3.55 | 8.10 | 52.73 | 4.27 | 0.72 |
| JBT-B | 88.85 | 4.25 | 3.76 | 4.40 | 75.75 | 3.33 | 0.43 |
| VES | 78.79 | 9.41 | 7.41 | 8.81 | 80.68 | 7.11 | 0.30 |

The average feed and gasifier residual rates are based on pilot plant operation data. Ash data are based on laboratory ash analysis results of feed and residual samples. Ash rates were calculated by multiplying the average flow rate with percent ash. The ash difference is the absolute value of the mass rate difference between the ash in the feed and the ash in the gasifier residual.

While the invention herein disclosed has been described by means of specific embodiments, examples and applications thereof, numerous modifications and variations could be made thereto by those skilled in the art without departing from the scope of the invention set forth in the claims.

What is claimed is:

1. A non-catalytic thermal decomposition process comprising:
   providing generally solid feedstock to a thermal decomposition unit;
   moving the feedstock through at least one gasification zone in the thermal decomposition unit with a moving device; and
   providing oxygen and optionally an additional gas to the gasification zone, wherein the oxygen and the optionally additional gas are provided to the moving device and exit at a face of the moving device;
   wherein feedstock is moved through the gasification zone and oxygen is provided to the gasification zone at rate effective for maintaining a material bed temperature not exceeding about 2300° F. at any point in the material bed, and for maintaining a material bed temperature of about 500° F. to about 2000° F.

2. The thermal decomposition process of claim 1 wherein the process is effective for maintaining an average material bed temperature of about 800° F. to about 1000° F. and a temperature variation across the material bed of about 300° F. or less.

3. The thermal decomposition process of claim 1 wherein the moving device is moved at a rate effective for providing a retention time of feedstock in the gasification zone of about 0.25 hours to about 3 hours.

4. The thermal decomposition process of claim 1 wherein the moving device is selected from the group consisting of a transfer ram, screw feed, and combinations thereof.

5. The thermal decomposition process of claim 4 wherein the moving device is a transfer ram.

6. The thermal decomposition process of claim 1 wherein oxygen is provided to the gasification zone at a rate of about 0.5 to about 1.5 lb-mol/hr-ft$^2$.

7. The thermal decomposition process of claim 1 wherein the additional gas is selected from the group consisting of $CO_2$, steam, nitrogen, methane and mixtures thereof.

8. The thermal decomposition process of claim 5 wherein oxygen is provided to the transfer ram and exits at a face of the transfer ram.

9. The thermal decomposition process of claim 1 wherein oxygen is provided to the gasification zone at a rate effective for providing an $O_2$:carbon ratio of about 0.1 to about 0.5.

10. The thermal decomposition process of claim 1 further comprising moving feedstock from the at least one gasification zone to at least one burn-up zone; moving the feedstock through the at least one burn-up zone with at least one ash ram; and
   conveying gas from the at least one gasification zone and at least one burn-up zone to a tar destruction zone to form a syngas.

11. The thermal decomposition process of claim 10 wherein feedstock is moved through the burn-up zone at a rate effective for providing a retention time of feedstock in the burn-up zone of about 0.5 hours to about 10 hours.

12. The thermal decomposition process of claim 10 wherein the process is effective for providing a syngas having a CO content of about 20 mole % or more.

13. The thermal decomposition process of claim 10 wherein the process is effective for providing a syngas having a $CO/CO_2$ ratio of at least 0.75.

14. The thermal decomposition process of claim 1 wherein the feedstock is selected from the group consisting of carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, and combinations thereof.

15. A non-catalytic thermal decomposition process comprising:
   providing a generally solid feedstock to a thermal decomposition unit;
   moving the feedstock through at least one gasification zone in the thermal decomposition unit with at least one transfer ram, wherein the transfer ram is moved at a rate effective for providing a retention time of feedstock in the gasification zone of about 0.25 hours to about 3 hours; and
   providing oxygen and optionally, an additional gas to the transfer ram and allowing the oxygen and the optional additional gas to exit at a face of the transfer ram at a rate of about 0.5 to about 1.5 lb-mol/hr-ft$^2$, wherein when the additional gas is provided, the oxygen and additional gas provided to the transfer ram are at a ratio of about 3:1 to about 1:2.

16. The thermal decomposition process of claim 15 wherein the additional gas is selected from the group consisting of $CO_2$, steam, nitrogen, methane and mixtures thereof.

17. The thermal decomposition process of claim 15 wherein the feedstock forms a moving material bed in the thermal decomposition unit.

18. The thermal decomposition process of claim 17 wherein the process is effective for maintaining a material bed temperature not exceeding about 2300° F. at any point in the material bed.

19. The thermal decomposition process of claim 18 wherein the process is effective for maintaining a material bed temperature of about 500° F. to about 2000° F.

20. The thermal decomposition process of claim 17 wherein the process is effective for maintaining an average material bed temperature of about 800° F. to about 1000° F. and a temperature variation across the material bed of about 300° F. or less.

21. The thermal decomposition process of claim 15 wherein oxygen is provided to the gasification zone at a rate effective for providing an $O_2$:carbon ratio of about 0.1 to about 0.5.

22. The thermal decomposition process of claim 15 further comprising moving feedstock from the at least one gasification zone to at least one burn-up zone; moving the feedstock through the at least one burn-up zone with at least one ash ram; and
conveying gas from the at least one gasification zone and at least one burn-up zone to a tar destruction zone to form a syngas.

23. The thermal decomposition process of claim 22 wherein the at least one ash ram is moved at a rate effective for providing a retention time of feedstock in the burn-up zone of about 0.5 hours to about 10 hours.

24. The thermal decomposition process of claim 22 wherein the process is effective for providing a syngas having a CO content of about 20 mole % or more.

25. The thermal decomposition process of claim 22 wherein the process is effective for providing a syngas having a $CO/CO_2$ ratio of at least 0.75.

26. The thermal decomposition process of claim 15 wherein the feedstock is selected from the group consisting of carbonaceous material, carbonaceous liquid product, carbonaceous industrial liquid recycle, carbonaceous municipal solid waste (MSW or msw), carbonaceous urban waste, carbonaceous agricultural material, carbonaceous forestry material, carbonaceous wood waste, carbonaceous construction material, carbonaceous vegetative material, carbonaceous industrial waste, carbonaceous fermentation waste, carbonaceous petrochemical co products, carbonaceous alcohol production co-products, carbonaceous coal, tires, plastics, waste plastic, coke oven tar, fibersoft, lignin, black liquor, polymers, waste polymers, polyethylene terephthalate (PETA), polystyrene (PS), sewage sludge, animal waste, crop residues, energy crops, forest processing residues, wood processing residues, livestock wastes, poultry wastes, food processing residues, fermentative process wastes, ethanol co-products, spent grain, spent microorganisms, and combinations thereof.

27. The thermal decomposition process of claim 8 wherein about 1 to about 10 poker rods extend away from the face of the transfer ram.

28. The thermal decomposition process of claim 27 wherein the transfer ram face includes gas nozzles located generally beneath the poker rods.

29. The thermal decomposition process of claim 15 wherein about 1 to about 10 poker rods extend away from the face of the transfer ram.

30. The thermal decomposition process of claim 29 wherein the transfer ram face includes gas nozzles located generally beneath the poker rods.

* * * * *